United States Patent
Hasenfratz et al.

(10) Patent No.: US 7,527,139 B2
(45) Date of Patent: May 5, 2009

(54) STOCK RETRIEVAL SYSTEM

(75) Inventors: Luc Hasenfratz, Hemel Hampstead (GB); Rupert Katritzky, London (GB); David Bevan, Winsford (GB); Tom Simcox, London (GB)

(73) Assignee: ARX Limited, Herts (GB)

( * ) Notice: Subject to any disclaimer, the term of this patent is extended or adjusted under 35 U.S.C. 154(b) by 0 days.

(21) Appl. No.: 10/568,608

(22) PCT Filed: Aug. 12, 2004

(86) PCT No.: PCT/GB2004/003474

§ 371 (c)(1),
(2), (4) Date: Sep. 21, 2006

(87) PCT Pub. No.: WO2005/016796

PCT Pub. Date: Feb. 24, 2005

(65) Prior Publication Data

US 2007/0124022 A1    May 31, 2007

(30) Foreign Application Priority Data

Aug. 13, 2003 (GB) ................................ 0319023.8

(51) Int. Cl.
*B65G 37/00* (2006.01)

(52) U.S. Cl. .............. 198/347.2; 414/277; 414/280; 700/243

(58) Field of Classification Search ............. 198/347.1, 198/347.2, 793, 797, 801; 414/277, 278, 414/280; 700/243, 242

See application file for complete search history.

(56) References Cited

U.S. PATENT DOCUMENTS

| 4,389,157 A | | 6/1983 | Bernard, II et al. |
| 4,470,741 A | * | 9/1984 | Bossler et al. ............. 414/280 |
| 5,208,762 A | | 5/1993 | Charhut et al. |
| 5,277,540 A | * | 1/1994 | Helms et al. ................ 414/280 |
| 5,363,258 A | * | 11/1994 | Coles et al. ................. 414/280 |
| 5,380,139 A | * | 1/1995 | Pohjonen et al. ............ 414/280 |
| 5,449,262 A | * | 9/1995 | Anderson et al. ........... 414/280 |
| 5,575,375 A | | 11/1996 | Sandusky et al. |
| 5,894,918 A | | 4/1999 | Bonnet |
| 6,059,509 A | * | 5/2000 | Ostwald ..................... 414/277 |
| 6,728,597 B2 | * | 4/2004 | Didriksen et al. ........... 700/243 |
| 2003/0065421 A1 | | 4/2003 | Didriksen et al. |

FOREIGN PATENT DOCUMENTS

| DE | 1 219 864 | 6/1966 |
| DE | 198 50 636 A1 | 5/2000 |
| EP | 0 864 513 A2 | 9/1998 |
| JP | 60082509 | 5/1985 |

* cited by examiner

*Primary Examiner*—James R Bidwell
(74) *Attorney, Agent, or Firm*—Blakely, Sokoloff, Taylor & Zafman LLP

(57) ABSTRACT

An apparatus for storing and dispensing of a plurality of items of stock (34) such as pharmaceuticals comprises a plurality of storage regions (20), e.g. shelves (26) and a dispensing station (48). The storage regions (20) are arranged to circulate around a continuous path (10) such that each storage region (20) is periodically brought into alignment with the dispensing station (48) so as to allow items to be removed from the storage region (20) at the dispensing station (48).

26 Claims, 11 Drawing Sheets

STOCK RETRIEVAL SYSTEM

This is a National Phase of International Application No. PCT/GB2004/003474, filed on Aug. 12, 2004, which claims priority from Great Britain Patent Application No. 0319023.8, filed on Aug. 13, 2003.

This invention relates to apparatus and methods for the automatic retrieval and dispensing of items of stock, particularly, although not exclusively, packets of pharmaceuticals and the like in a pharmacy.

Automated pharmacies, whereby pharmaceuticals and the like are retrieved and dispensed without the need for human intervention, are known in the art. Typically such systems comprise a robot arm in communication with a database of the locations of the packs on the shelves. When a request for a particular pack is received, the robot arm moves to the correct location, retrieves the desired pack and transfers it to a dispensing chute.

The maximum output rate of such systems is limited by the speed with which the robot arm can move and the sweep area of the arm—i.e. the area which the arm may be required to cover. Clearly the output rate may be increased by providing a second or further robot arms, but this adds significantly to the cost and also adds to the complexity as they must be coordinated with one another. Shelf space tends to be allocated dynamically in such arrangements as drugs are put into the system so that there is no correlation between the type of drug and its location. Consequently there is no correlation between the type of drug and the time taken for it to be dispensed.

It is recognised in the art however that some types and sizes of pharmaceutical packs are required much more often than others. In one commercially available system these so-called 'fast movers' are stored in separate, specially-designed shelves, each of which has its own ejection mechanism for ejecting the pack into a dispensing chute. Thus when a request for a fast mover is received, rather than being picked from the main shelves and delivered to the dispensing chute by the robot arm, the required pack is dispensed directly from the special shelf. This significantly increases the speed with which such fast movers may be dispensed and increases the overall output rate since the robot arm is not tied up with picking the commonly requested packs.

However, this arrangement is significantly more costly when compared with a standard system since the special shelving (usually declined towards the front to aid ejection) must be installed and because each line on each shelf requires its own ejection system. Furthermore, the system either requires a complex and costly conveyor system to deliver the fast mover packs to the normal dispensing chute, or they are delivered somewhere else which necessitates personnel leaving the counter to collect them (thus defeating a purpose of an automated pharmacy) and can also mean that prescriptions become mixed up.

The Applicant has recognised a further drawback with the arrangement described above—namely that the allocation of fast movers to the special shelving is inflexible. By contrast the Applicants have recognised that the fast movers will tend to depend on the time of year and even the time of day. The existing system cannot easily adapt to this. Furthermore, the existing system requires the special shelves to be configured to a particular size and shape of pack—meaning that if the size or shape of a pack should be changed by the manufacturer, the corresponding shelf will need to be reconfigured.

It is an aim of the present invention to provide an improved arrangement which alleviates at least some of the problems set out above. When viewed from a first aspect the present invention provides an apparatus for storing and dispensing of a plurality of items of stock comprising a plurality of storage regions and a dispensing station, wherein said storage regions are arranged to circulate around a continuous path such that each storage region is periodically brought into alignment with the dispensing station so as to allow items to be removed from the storage region at the dispensing station.

When viewed from a second aspect the invention provides a method of storing and dispensing a plurality of items of stock comprising placing said items of stock in a plurality of storage regions and circulating said storage regions around a continuous path such that each storage region is periodically brought into alignment with a dispensing station and removing items from the storage region at the dispensing station.

Thus it will be seen by those skilled in the art that in accordance with the invention items—such as pharmaceutical packs—may be stored in circulating storage regions and ejected at a dispensing station when required. By employing the arrangement of the invention in an automated pharmacy and using it to store fast movers—i.e. commonly requested packs—a significantly higher output rate may be achieved as compared to a system without this arrangement. However, this may be achieved without increasing the overall cost too greatly since it does not require an ejection mechanism for each storage region. Indeed only a single dispensing station could be employed. Furthermore, since removal of stored items takes place only at the dispensing station—i.e. a predetermined point on the circulatory path—the items may be loaded onto the storage regions from the same side that they will be ejected. This allows greater flexibility in the design and operation of the system.

The storage regions may be circulated by any suitable means e.g. a chain, conveyor belt, track or the like. The storage regions of the invention could simply comprise areas of the conveyor belt, track or the like.

Preferably though the storage regions are physically delimited. This will help to ensure that an item in the storage region remains within at least a known range of positions to allow reliable transfer to the dispensing station.

Preferably the storage regions comprise at least one shelf, more preferably a plurality of shelves. The shelves help to contain the items whilst allowing free access for loading or removing them. The provision of a plurality of shelves opens up the possibility of dispensing a plurality of items simultaneously. Most preferably such shelves are reconfigurable in width and/or height—e.g. by using temporary dividers—to allow most efficient use of the storage region. The removal of the items from the storage region at the dispensing station could be achieved in a large number of ways. The storage region itself may comprise means for removing an item or items therefrom. For example where shelves are provided these could be arranged to tilt. Alternatively the storage region may comprise a pusher of some description. In preferred embodiments however, the dispensing station comprises means for removing items from the storage regions. This helps to realise the advantages available in accordance with the invention of minimising the cost thereof by avoiding the need for each storage region to have dedicated dispensing means. For example, only a single dispensing station and associated dispensing means could be provided.

The dispensing means could comprise any one of a number of arrangements for removing items from the respective storage region. The possible arrangements fall into two broad categories. In the first category are those adapted to operate from the opposite side of the storage region to where it is intended that removed items will be received and which will therefore operate essentially by a pushing action. The pushing action may involve physical contact e.g. as with a push-rod, or may for example comprise a blast of pressurised gas to blow items from the storage region.

In the alternative dispensing means operating by a pulling action could operate from the same side of the storage region as removed items are received. In the latter category two particular arrangements are preferred. The first comprises a claw arranged to hook over and pull the item off the storage region. The second is a suction probe arranged to generate a reduced pressure between its end face and a side of the item to allow the packet to be pulled off by retracting the probe. It is envisaged however that other arrangements may be possible—e.g. a pincer similar to that used in robot arms or a mechanism involving cooperation between the dispensing station and the storage region.

Means for dispensing a single pack at a time may be provided. However, it is preferred that the dispensing means is adapted to be able to remove a plurality of items simultaneously from a single storage region. For example in the preferred embodiment wherein each storage region comprises a plurality of shelves, a plurality of dispensing means—e.g. pushers or claws may be provided corresponding to respective shelves, most preferably with a mechanism being associated with each of the shelves. Such plural dispensing means could work independently of one another or may all be operated together. Clearly this factor will influence the possible arrangements in which the packs maybe stored in an apparatus in accordance with the invention. If plural dispensers operate together, only packs to be dispensed together may be stored on the corresponding shelves of a given storage region.

The dispensing station preferably comprises a dispensing chute for receiving items which are removed from the storage region at the dispensing station. Such chutes are well known per se and any suitable configuration may be employed.

The storage regions may be circulated continuously. This requires that the loading and removal of items from the storage regions can be accomplished sufficiently quickly relative to the transit time of the storage region past a given point. Alternatively they may be circulated only when required, preferably in such arrangements only until the desired storage region is aligned with the correct dispensing station or loading point. Of course, in the latter arrangement the direction of circulation may be chosen to achieve such alignment in the shortest possible time.

As mentioned above, the benefits available in accordance with the invention may be maximised by using it in conjunction with an automated pharmacy or other automatic stock storage and retrieval system of known type. When viewed from a further aspect therefore the invention provides an automated stock storage and retrieval system comprising stock transfer means for transferring items of stock from an input area to a storage area and for subsequently retrieving said items of stock, the apparatus further comprising an apparatus for storing and dispensing of a plurality of items of stock comprising a plurality of storage regions and a dispensing station, wherein said storage regions are arranged to circulate around a continuous path such that each storage region is periodically brought into alignment with the dispensing station so as to allow items to be removed from the storage region at the dispensing station; wherein the stock transfer means is arranged selectively to load items onto said circulating storage regions.

Thus in accordance with the above aspect of the invention, items of stock may be stored in the circulating storage regions as well as or instead of being stored in the normal static storage. Several possibilities arise. An item may be input into the system using the input area as normal and the stock transfer means controlled to load it directly onto one of the circulating storage regions rather than the static storage area. This is particularly advantageous in the case of commonly requested items—i.e. so-called "fast movers". These may then be dispensed rapidly on request by avoiding the delay inherent in picking and transferring from the static storage by the stock transfer means—such as a robot arm.

Furthermore, it will be appreciated that since space in the circulating storage regions may be allocated dynamically, the classification of particular items as fast movers is very flexible and may be modified rapidly. Indeed it is envisaged in accordance with preferred embodiments that items could be removed from the circulating storage regions and replaced in the event that they are de-classified as fast movers.

Alternatively, an item may be input and transferred to the static storage as in known systems and thereafter transferred from the static storage to a circulating storage region. This is advantageous in the case of a fast mover which requires replenishment on the circulating storage apparatus or where items of stock held in static storage are later classified as fast movers.

Additionally this procedure may be beneficially used in making up an advance order. In prior art systems no increase in output speed is achievable for such orders however much advance notice is given (unless they are stored temporarily outside the system, which is undesirable). In accordance with the invention however, such orders may be made up during the period of notice and stored in a circulating storage region. When required the whole order could be dispensed simultaneously if it is sorted in a single storage region. Such dynamic loading of a rapid dispensing apparatus is not possible in accordance with known systems.

In preferred embodiments the circulating storage apparatus is configured to allow items to be placed manually in its storage regions. This is beneficial in coping with awkwardly shaped or sized items which may not be accommodated by the conventional storage system.

Although not essential, more than one dispensing station may be provided which will further increase the potential output rate. The dispensing stations could be arranged to dispense to a single point or to different points—e.g. for operation by a plurality of users. Equally more than one apparatus in accordance with the invention may be provided in a given system.

Certain preferred embodiments of the invention will now be described, by way of example only, with reference to the accompanying drawings in which.

Figures 1A, 1B:
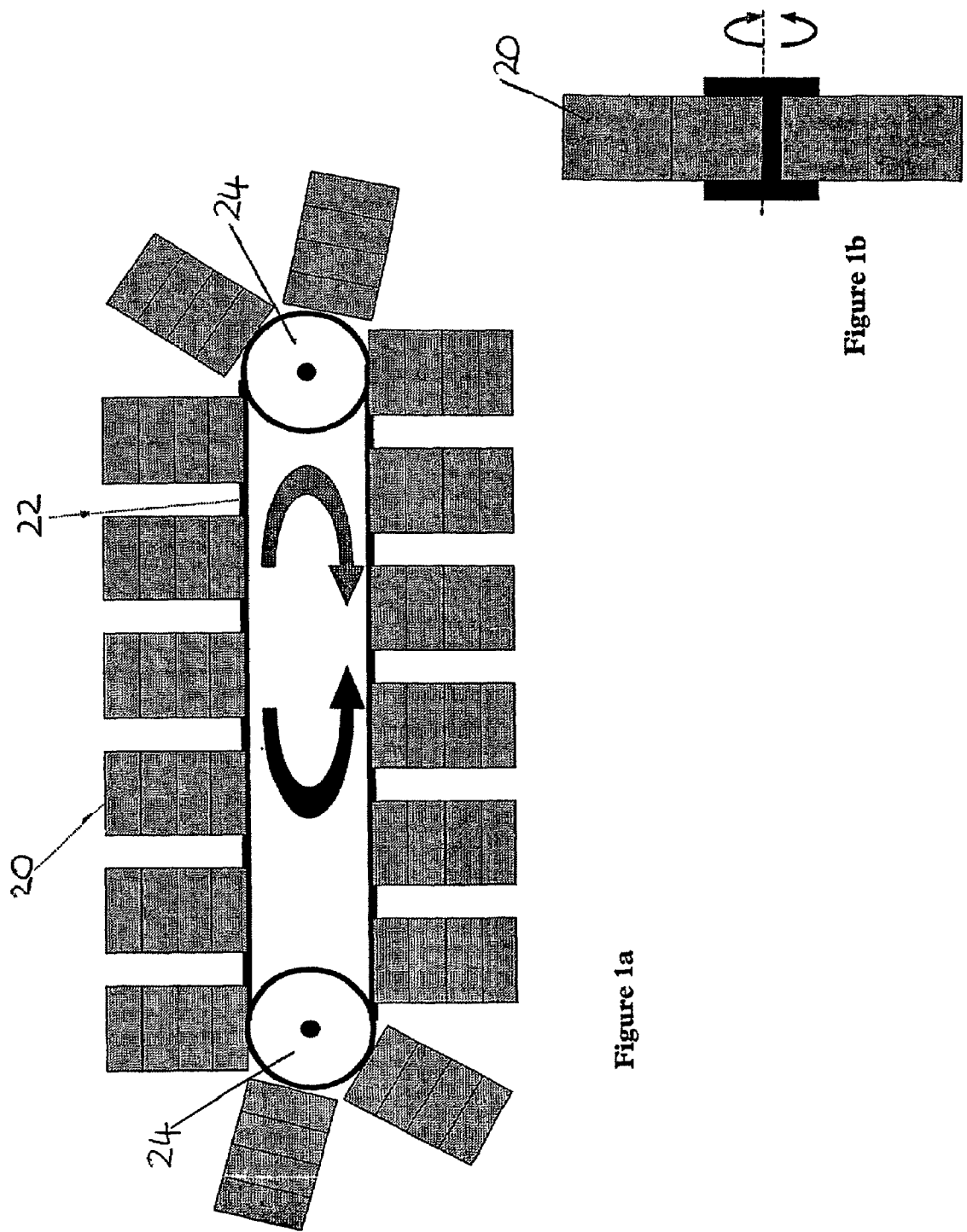
FIGS. 1a and 1b are front and side views respectively of a stock storage apparatus in accordance with the invention.

FIGS. 1a and 1b show respectively a front and side view of a circulating storage apparatus in accordance with a first embodiment of the present invention. The apparatus broadly comprises a plurality of storage regions provided by shelf modules 20 which are attached at one end to a conveyor belt 22 which passes over a pair of rollers 24. One of the rollers 24 is driven by a motor (not shown).

Figure 2A:
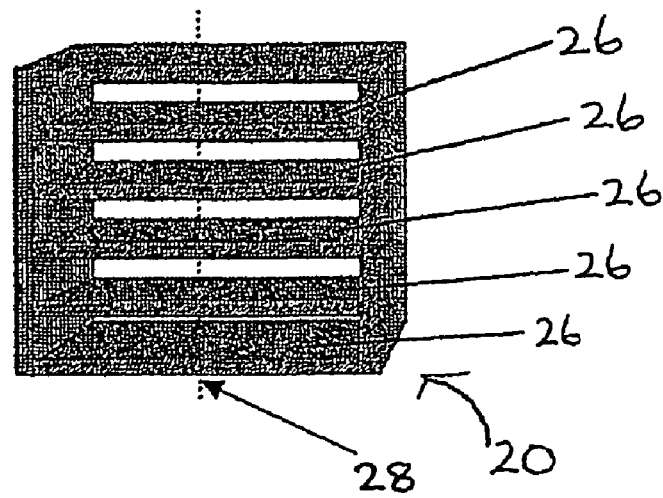
FIGS. 2a and 2b are detail views of two examples of shelf modules usable in accordance with the invention.

One of the shelf modules 20 may be seen in greater detail in FIG. 2a where it may be seen that it comprises five shelves 26 on each of which an item such as a pharmaceutical pack may be placed. An optional vertical divider 28 may be provided in some or all of the shelf modules 20 in order to sub-divide these shelves to allow a larger number of smaller packs to be received.

Figure 2B:
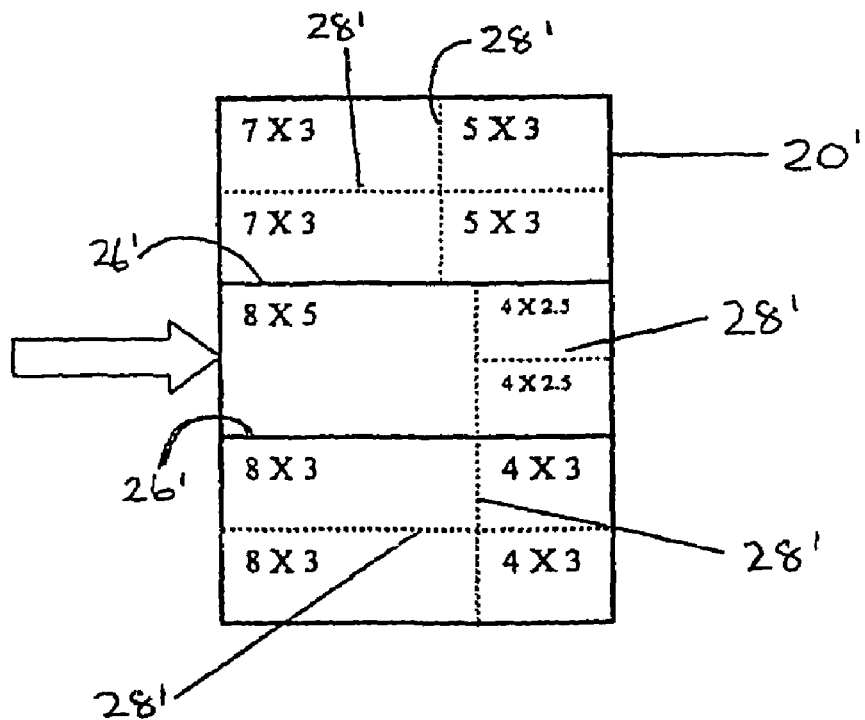

A schematic diagram of another embodiment of a shelf module 20' is shown in FIG. 2b. In this example the module comprises two fixed shelves 26' and a series of horizontal and vertical removable dividers 28'. It will be seen from FIG. 2b that this combination of fixed shelves 26' and removable dividers 28' allows great flexibility in the size and shape of the individual shelf spaces formed.

Figure 14:
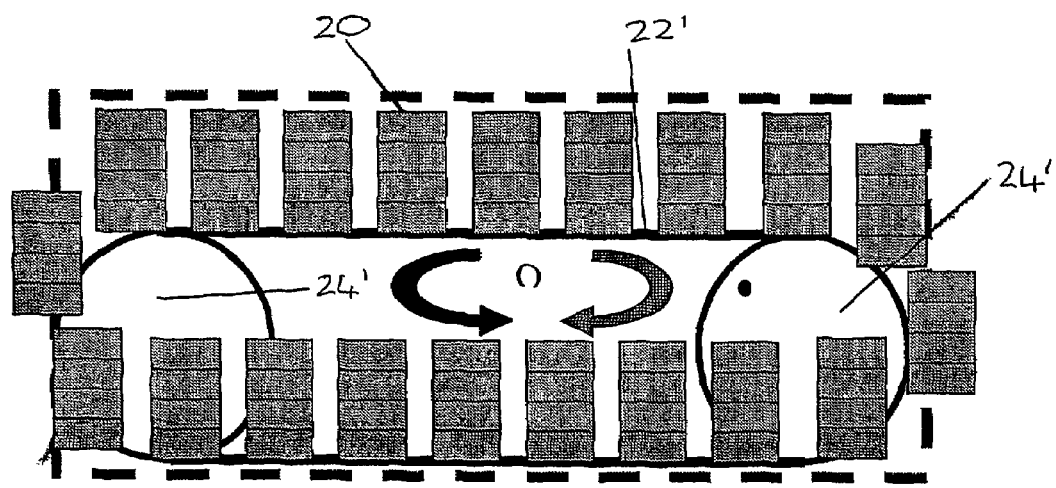
FIG. 14 is a view similar to FIG. 1a of another embodiment of the invention.

As will be clear from FIGS. 1a and 1b, in this embodiment the shelf modules 20 are circulated by the belt 22 in a plane parallel to their height. This means that packs stored on the shelves 26 will be transferred between the lower and upper faces of the respective shelves as each shelf module 20 is alternately inverted at each end of the travel. An alternative to this arrangement is shown in the embodiment of FIG. 14. In this embodiment, the orientation of the shelf modules 20 is maintained throughout their travel. This requires the drums 24' to be larger and thus the belt 22' to be longer but it is possible for the FIG. 14 embodiment can be operated with less noise than that in FIG. 1. The overall size of the apparatus is the same.

As is clear from FIG. 2a, the shelves 26 are open at both sides to allow loading into and/or removal from either side. The circulation speed of the conveyor belt is sufficiently low to prevent the danger of packs being thrown off the shelves.

In use one or more dispensing stations are provided around the travel and these will be described below. However, they are omitted from the present Figure for the sake of clarity.

Figure 3C:
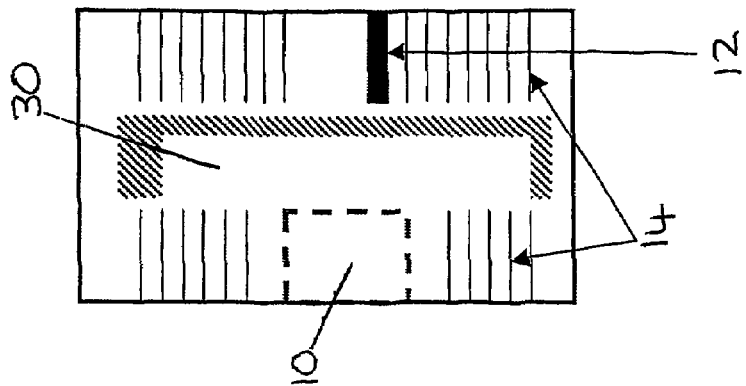
FIGS. 3a-3c show schematically how the apparatus of FIG. 1 may integrate physically with an automated pharmacy.
Figure 3A:
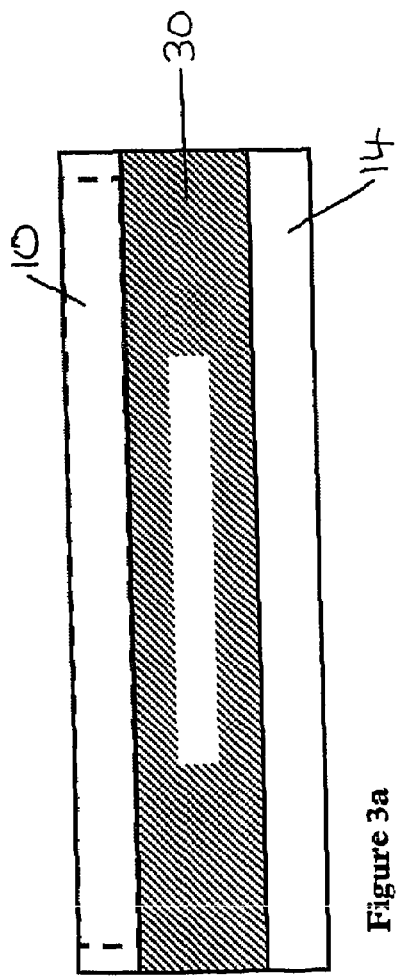
Figure 3B:
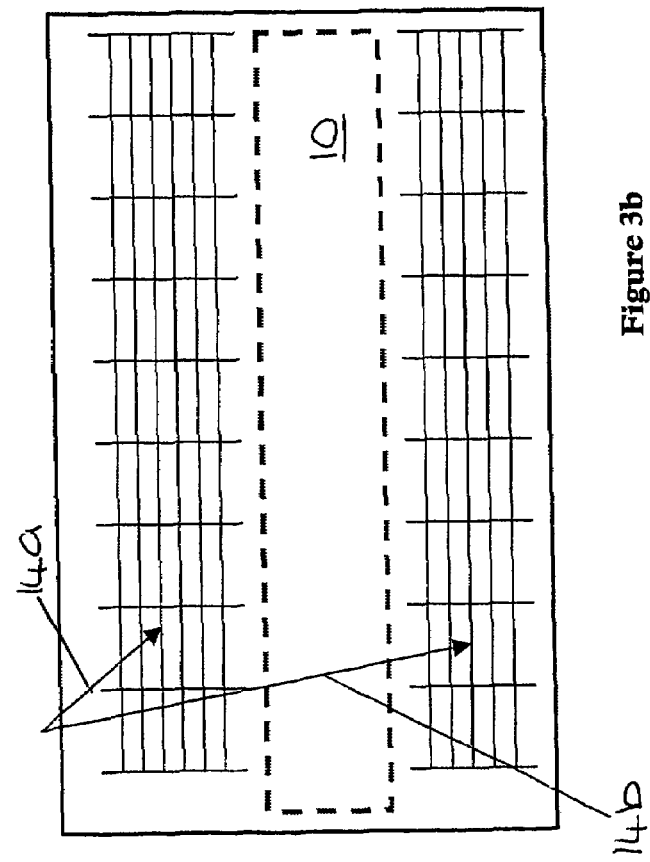

FIGS. 3a, 3b and 3c are respectively plan side and front schematic representations of the physical integration of the apparatus of FIGS. 1a and 1b into a automated pharmacy. Considering firstly the plan view of FIG. 3a, it will be seen that the circulating storage apparatus 10 of FIGS. 1a and 1b is provided parallel to and spaced from the ordinary static shelving 14. The area 30 between the circulating and static storage 10, 14 is the envelope of required movement for the robot arm (not shown) in order to allow it to access all of the static shelving 14. It will be seen from a consideration of FIGS. 3b and 3c that in fact further static shelf space 14a, 14b may be provided above and below the circulating storage apparatus 10 (shown only schematically in these Figures by the volume of space it requires). Therefore, the circulating storage apparatus in accordance with the invention need only require to replace an ordinary section of static shelving and does not need any wholesale redesign of the automated pharmacy.

Figures 4A, 4B:
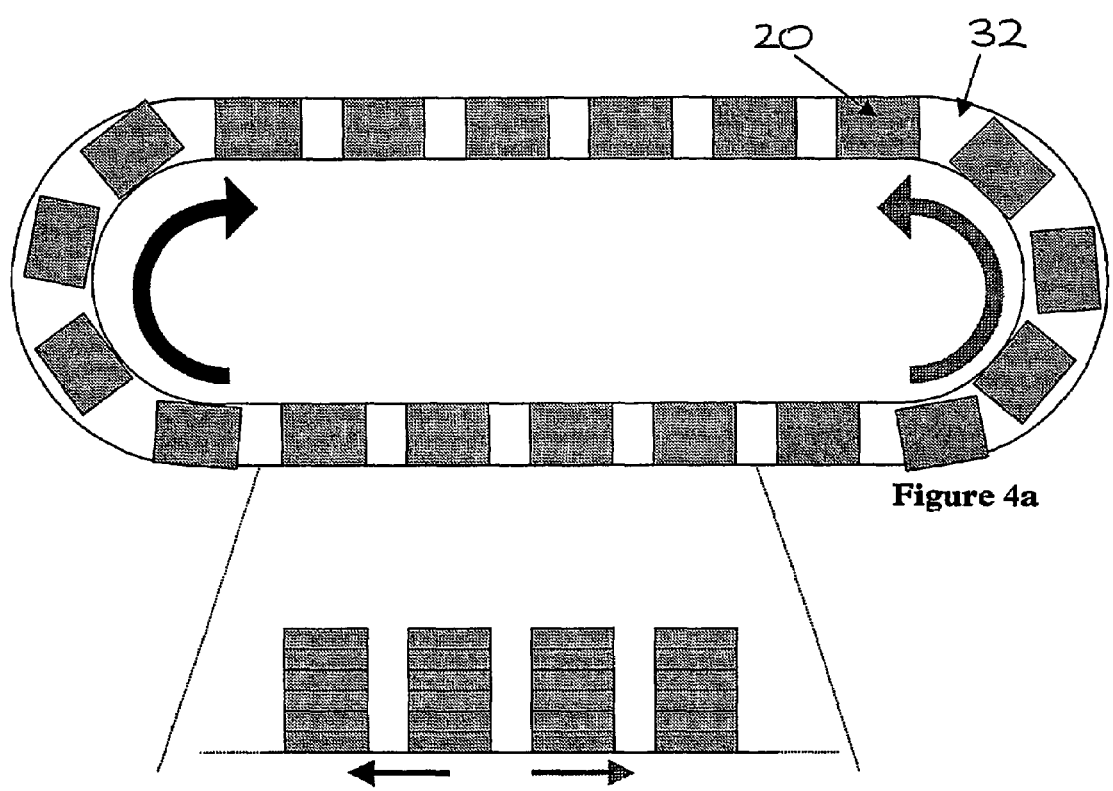
FIGS. 4a and 4b are front and side views respectively of a stock storage apparatus in accordance with another embodiment of the invention.

FIGS. 4a and 4b show plan and side views of a second embodiment of the circulating storage apparatus of the invention. In this embodiment, the shelving modules 20 are also attached at their lower end to a conveyor belt 32 but in this embodiment the conveyor belt 32 circulates in a plane perpendicular to the height of the shelf modules 20 so that they remain upright at all points on the travel of the belt 32. Again, the dispensing stations are omitted for clarity from this diagram.

Figure 5A:
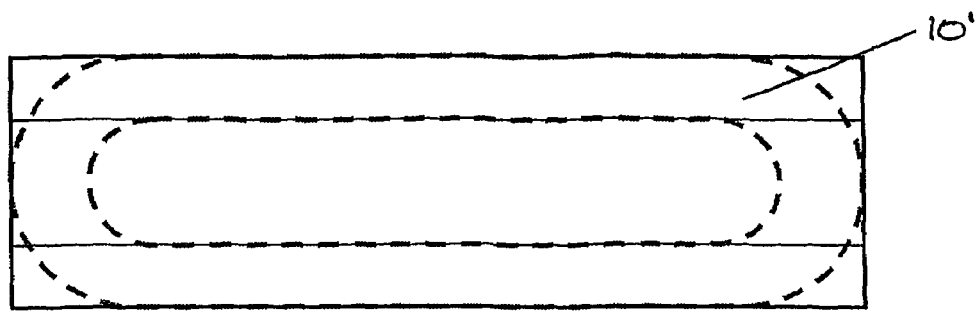
FIGS. 5a-5c show schematically how the apparatus of FIG. 4 may be integrated physically into an automated pharmacy.
Figure 5B:
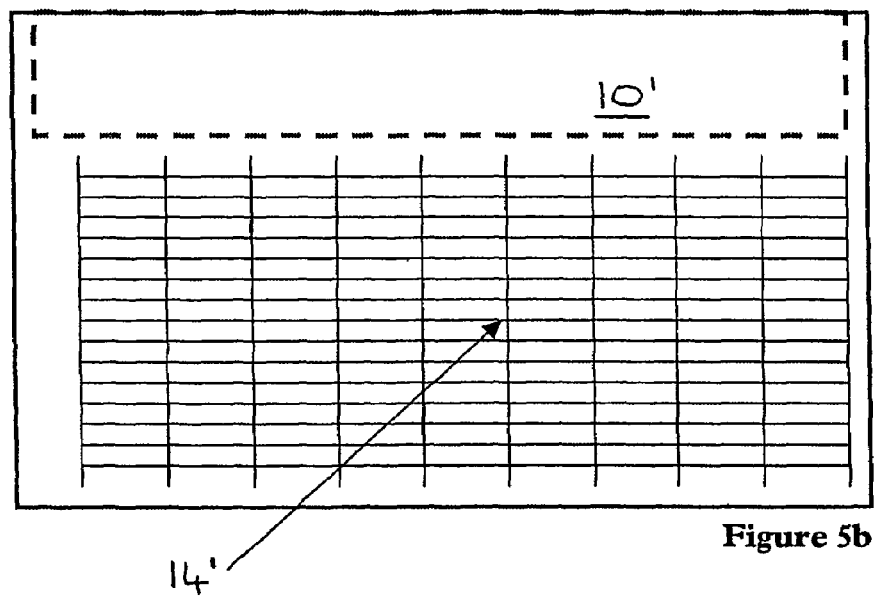
Figure 5C:
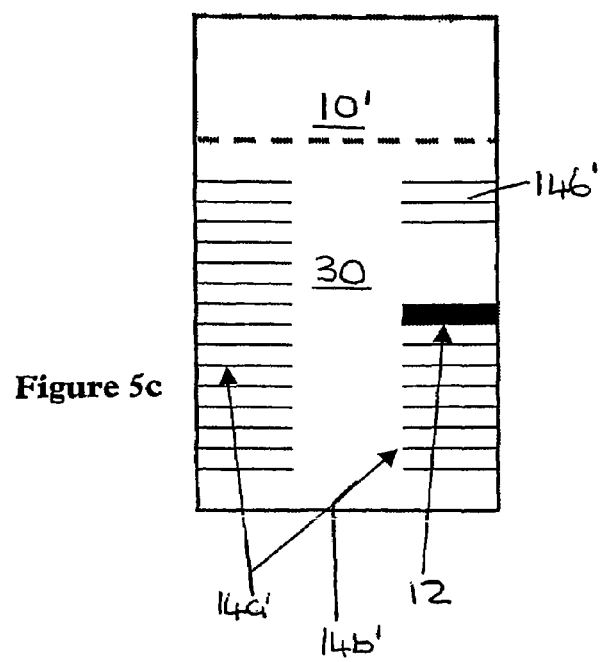

Turning to FIGS. 5a, 5b and 5c the effect of the different shape of the circulating storage apparatus in FIGS. 4a and 4b on its installation in the automated pharmacy may be seen. More specifically, the circulating storage apparatus 10' replaces the top shelves of an existing installation so that it sits above the static shelving 14'.

The width of the conveyor belt path is set to be the same as the separation of the two banks of shelving 14a', 14b' so that the shelf modules 20 will be located in the same positions as portions of static shelving would have been. This allows simple loading of the shelf modules 20 by the robot arm (not shown) from inside the oval. It will also be clear from the foregoing that this embodiment is easily retrofitted to existing installations simply by removing the upper shelves.

Figure 6:
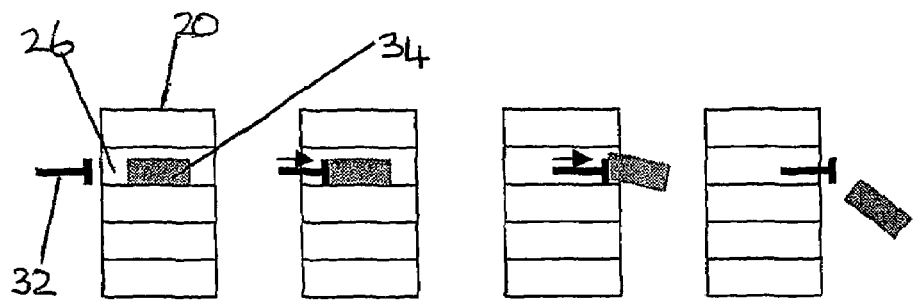
FIG. 6 is a series of views showing the operation of a first embodiment of an ejection system.

FIG. 6 comprises a series of diagrams the operation of a first embodiment of a stock removal means associated with a dispensing station for removing items from the shelves 26. In this embodiment, part of the dispensing station's stock removal system is located on the opposite side of the shelf module 20 to where the removed pack will be received. The removal system comprises a horizontally moveable pusher 32 which, when actuated, passes horizontally into the space above one of the shelves 26, engages with a pack 34 stored on the shelf and pushes it to the far edge of the shelf 26 so that it falls out to be received by a dispensing chute from which it is made available to the appropriate personnel.

Once the pack 34 has been removed, the pusher 32 is withdrawn from the shelf space so that the shelf module 20 may move away from the dispensing station without fouling the pusher 32. If continuous circulation is employed, the duration of the pushing and retraction cycle of the pusher 32 will be arranged to be very short in comparison with the time taken for the shelf module 20 to traverse the dispensing station.

Although only a single pusher 32 in alignment with the fourth shelf up is shown, in fact a pusher 32 is provided for each of the shelves 26 and these have simply be omitted for clarity. Having a pusher 32 for each shelf 26 allows all of the packs stored in the shelf module 20 to be ejected simultaneously. It is even envisaged that there may be more than one pusher per shelf where the shelves are subdivided as shown in FIG. 2.

A slightly different alternative (not depicted) to this physical contact arrangement would be to use one or more jets of pressurised air or other gas to blow the packs off the shelves. This would have the advantage that there would be no physical member to withdraw after dispensing and thus it may be possible for the shelf modules continuously where otherwise it would not have been.

Figure 7:
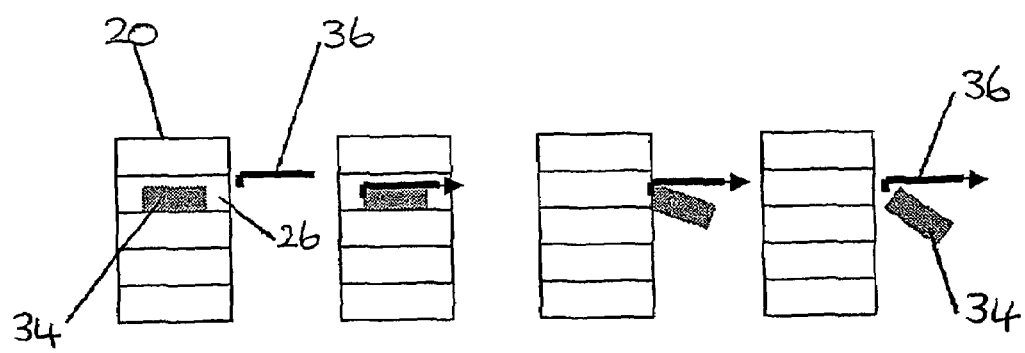
FIG. 7 is a series of views of a second embodiment of an ejection system.

FIG. 7 shows an alternative removal mechanism. This arrangement is provided on the same side of the shelf module 20 as the removed pack 34 is received. In this embodiment, a claw member 36 is advanced into the shelf space 26 and hooked over the far edge of the pack 34 whereafter the claw 36 is retracted, pulling the pack 34 off the shelf. It will be appreciated that some vertical as well as horizontal movement of the claw 36 will be required in order to prevent it accidentally pushing the pack off the far edge of the shelf 26. It will further be appreciated that this requires a gap between the top of the pack 34 and the shelf 26 above and there is therefore a limit on the maximum dimensions of packs which may be removed from the shelf in this way.

Figure 8:
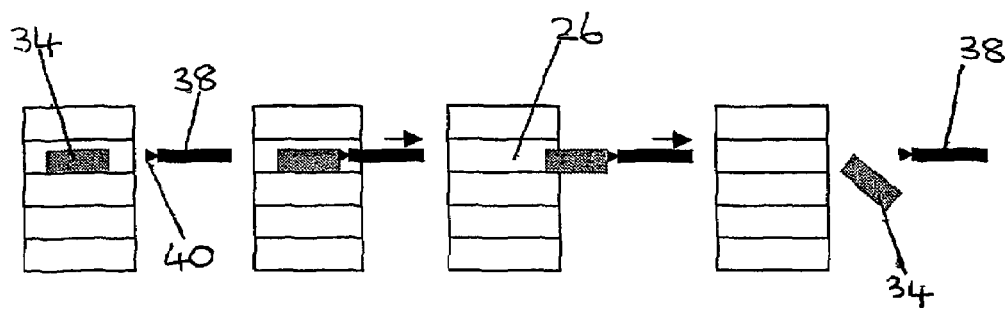
FIG. 8 shows a third embodiment of an ejection system.

FIG. 8 shows another embodiment which operates from the same side as removal takes place. In this embodiment, a suction probe 38 is advanced towards the pack 34 until a rubber suction cup 40 at its distal end forms a seal with a side wall of the pack 34 which allows a low pressure region inside the suction cup 40 to be achieved thereby adhering the pack 34 to the suction probe 38. The suction member 38 may then be withdrawn pulling the pack 34 with it off the edge of the shelf 26. Once the pack 54 is completely clear of the shelf, it will fall away from the suction probe 38 since the suction force of the latter is not sufficient to overcome the weight of the pack when it is no longer supported by the shelf. As in previous embodiments, the pack 34 may then be received in a dispensing chute.

Figure 9:
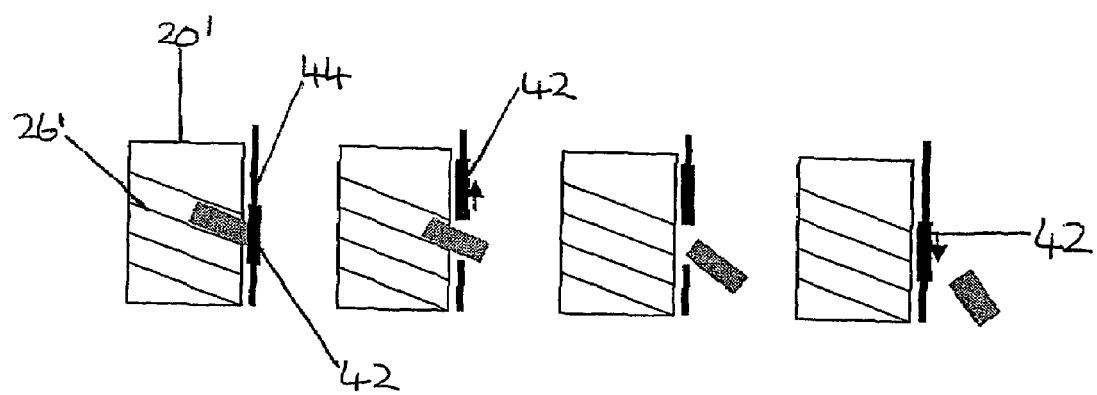
FIG. 9 shows a fourth embodiment of an ejection system.

A fourth embodiment of a stock removal system is shown in FIG. 9. In this arrangement, the shelves 26' of the shelf module 20' are declined towards the ejection side of the module 20'. The packs 34 on the sloping shelves 26' are prevented from falling off the respective shelf by a gate 42 in a side wall 44 of the dispensing station. Ejection of the pack 34 may then be achieved simply by raising the gate 42 at the desired point until the pack 34 has fallen off the shelf 36' whereafter the gate 42 may be lowered again. It will be appreciated that in accordance with this embodiment, a side wall must be provided all the way around the conveyor belt to prevent the stored packs from falling off before they are required. Alternatively, the shelves may be tilted only when they reach the dispensing station.

Figure 10A:
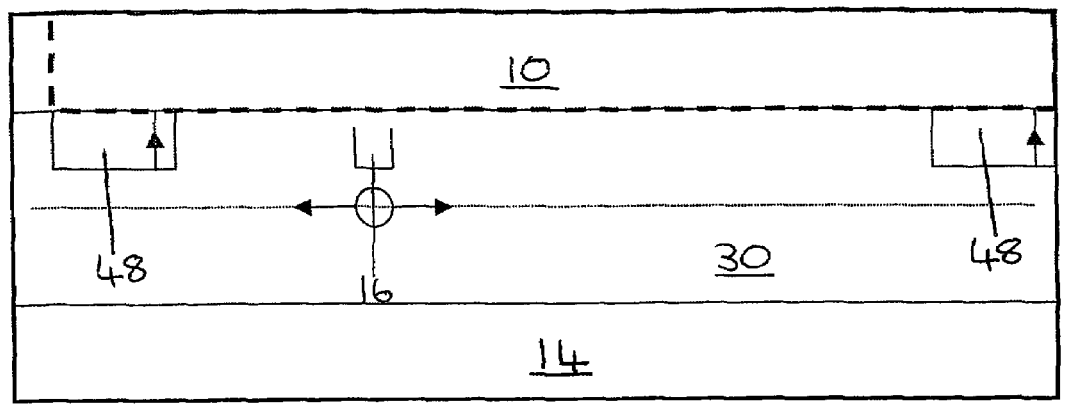
FIGS. 10a and 10b are plan views similar to FIG. 3a showing possible locations for dispensing stations.
Figure 10B:
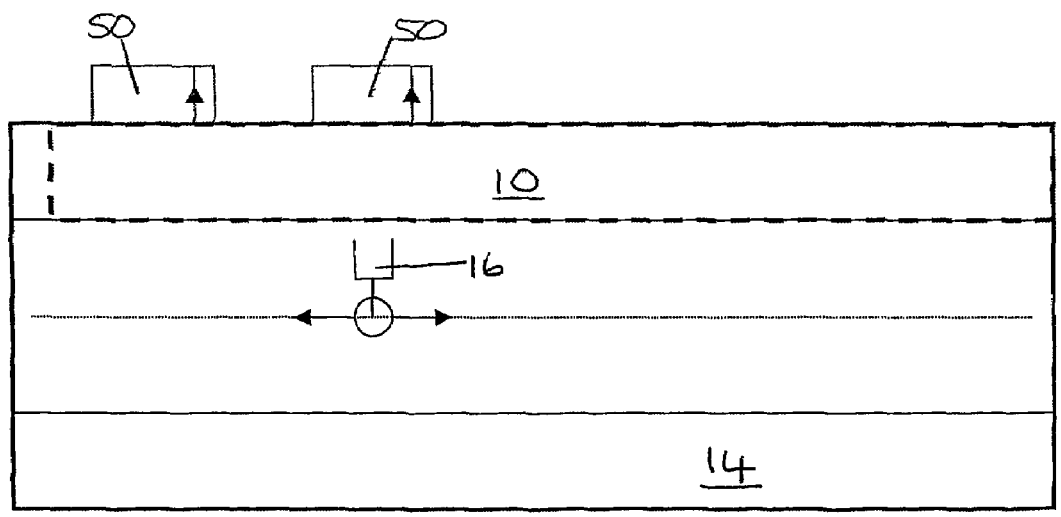

FIGS. 10*a* and 10*b* are both schematic plan views of an automated pharmacy incorporating the embodiment of the invention shown in FIG. 1. However, FIGS. 10*a* and 10*b* show additionally possible locations for dispensing stations. In FIG. 10*a*, the dispensing stations 48 are located on the inside of the circulating storage apparatus 10 i.e. within the movement envelope 30 of the robot arm 16. This requires some moderate additional programming for the robot arm to ensure that it does not foul the dispensing stations 48 but has the advantage that the overall size of the system is minimised. The dispensing stations 48 could, for example, comprise pushers as described with reference to FIG. 6.

The dispensing stations 50 in FIG. 10*b* are on the outside, i.e. the dispensing side, of the circulating storage apparatus 10. These could employ stock removal systems such as those shown in FIGS. 7, 8, and 9. Clearly the advantage of this arrangement is that the dispensing stations 50 do not interfere with the operation of the robot arm 16.

Figure 11A:
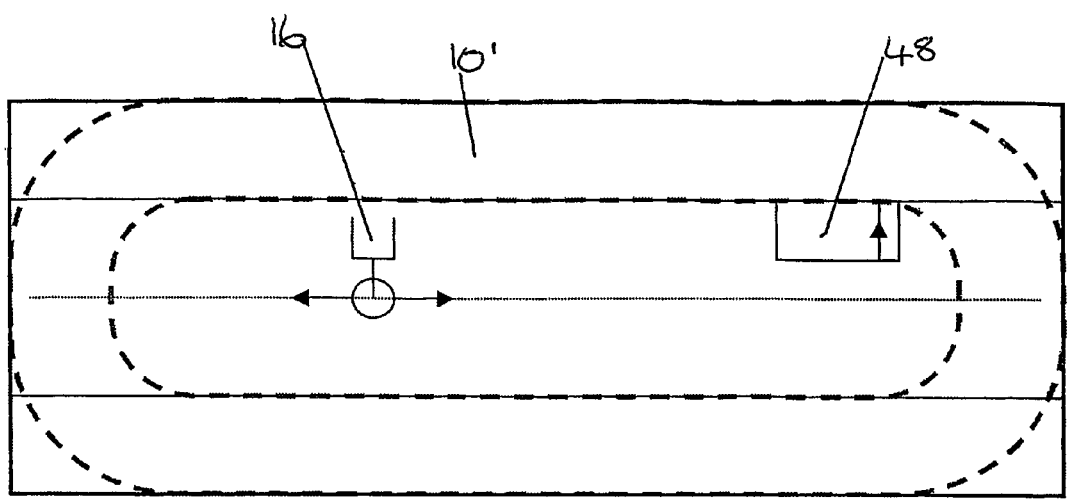
FIGS. 11a and 11b are plan views similar to FIG. 5a showing possible locations for dispensing stations in that embodiment.
Figure 11B:
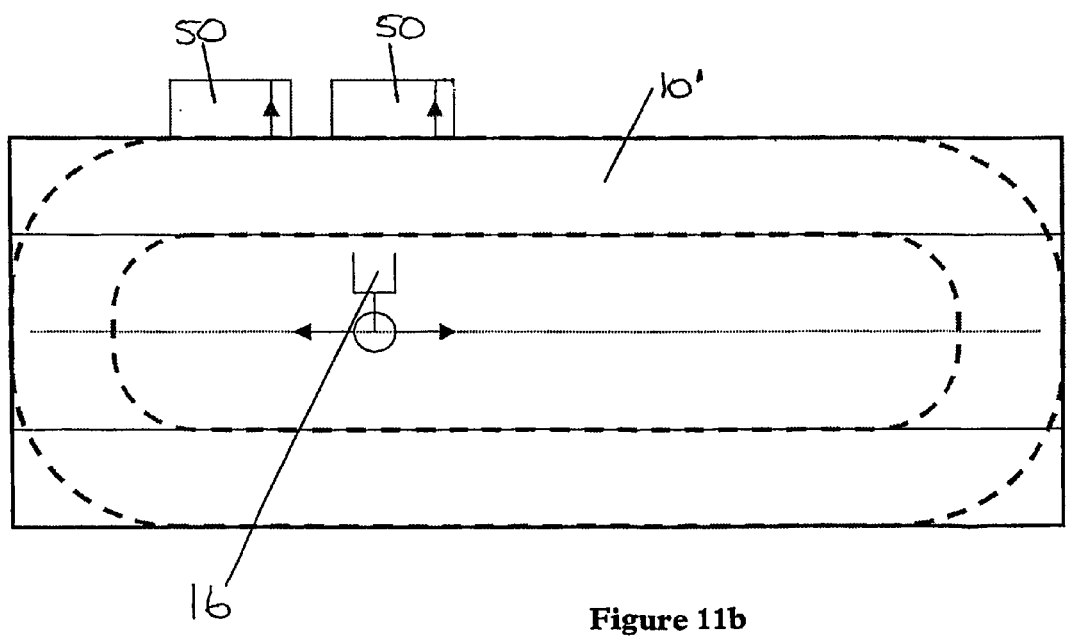

FIGS. 11*a* and 11*b* are similar to FIGS. 10*a* and 10*b* respectively except that the circulating storage apparatus shown in FIG. 4 is employed instead.

Use of the apparatus described hereinabove and its operational integration into an automated pharmacy will now be described with reference to FIGS. 12 and 13.

Figure 12:
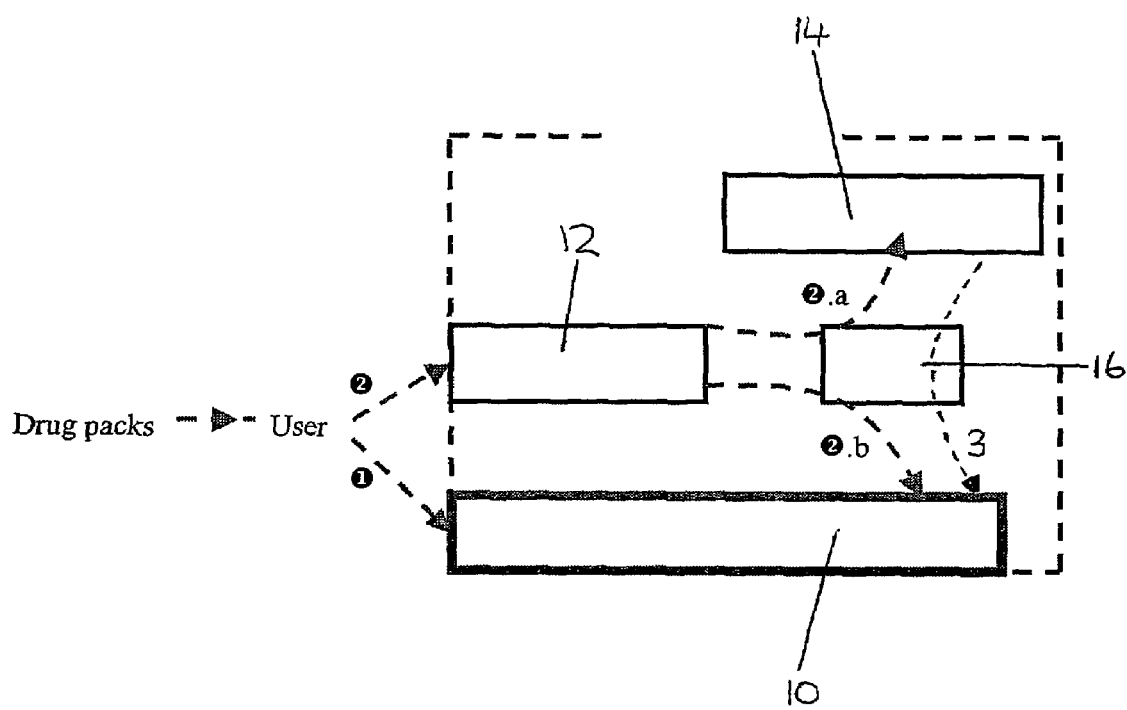
FIGS. 12 and 13 are schematic diagrams showing how an apparatus in accordance with the invention may be integrated functionally with a known automated pharmacy.

Turning firstly to FIG. 12, there may be seen a schematic diagram showing the operational integration of a stock storage apparatus 10 in accordance with the present invention with a known automated pharmacy system comprising a drug pack input belt 12, static shelving 14 and a robot arm 16.

The two broken arrows 1,2 shown at the left hand side of the diagram indicate the possibility in accordance with this arrangement either of placing drug packs onto the input belt 12 (arrow 2) in the known way or alternatively loading packs directly into the circulating storage apparatus 10 in accordance with the invention (arrow 1). This latter possibility is particularly useful for loading unusually shaped or sized items, for example bottles, tubes or over-sized packets, which it may not be possible to accommodate within the known pharmacy system 12-16.

Those packs which are entered into the pharmacy system using the ordinary input belt 12 (arrow 2) may then be placed onto the static shelving 14 by the robot arm 16 (arrow 2*a*) as is well known in the art, but alternatively packs may be loaded by the robot arm 16 directly into the circulating storage apparatus 10 (arrow 2*b*). The decision as to which of these options to take is made by software controlling the robot arm 16 based on the type of pack that has been placed onto the belt 12. If there is expected to be a regular high demand for the particular pack i.e. the pack is classified as a 'fast mover' or if multiples of a pack are often required together, the controlling software will direct the robot arm 16 to place the pack directly into the circulating storage apparatus 10 to allow it to be rapidly dispensed. If the particular pack does not fall within the definition of a fast mover, it will be placed onto the static shelving 14 in the known way.

A third possibility is indicated schematically by arrow 3. In this procedure a drug pack may be picked from the static shelving 14 by the robot arm 16 and placed onto the circulating storage apparatus 10. This would be appropriate for example where an advance order was being made up which included at least some non-fast movers which would therefore be located on the static shelving 14. The advantage of this procedure is that when the order is ready, it may be dispensed altogether from the circulating storage apparatus 10 rather than having to be picked one pack at a time by the robot arm 16 as in current systems or, undesirably, stored outside of the system. This procedure may also be used to replenish fast movers on the circulating storage 10 from additional stock on the static shelves 14 or to move packs onto the circulating storage if they are subsequently classified as fast movers.

Figure 13:
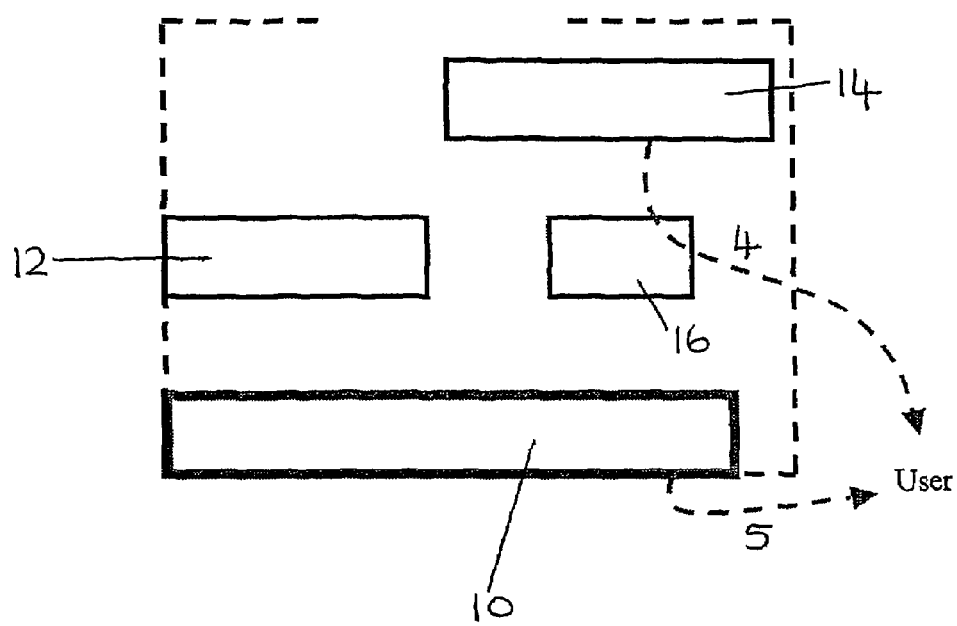

FIG. 13 shows the possibilities for dispensing packs in accordance with the invention. Arrow 4 shows the conventional method whereby the robot arm 16 picks and dispenses packs from the static shelving 14 one at a time. The second possibility given in accordance with the present invention is shown by arrow 5 in which packs may be dispensed, possibly several simultaneously, from the circulating storage apparatus 10. Of course, since these two methods of dispensing are independent of one another, they may be carried out in parallel.

Thus it will be seen from the foregoing that in accordance with the invention a flexible, dynamically allocatable storage space is provided from which pharmaceutical packs may be dispensed very rapidly. By stocking this storage space with fast movers, not only is the output rate for these packs significantly increased, but the overall output rate for the system is also significantly increased firstly since fast movers represent a significant proportion of all the packs dispensed; and secondly because the robot arm is then freed to pick less common requests from the ordinary static shelving. It will further be appreciated that advanced orders may be made up in quiet periods between real time orders and placed in a single shelf module so that when the patient comes to collect the prescription, all of the packs may be dispenses simultaneously.

It should be understood that whilst the preferred embodiments of the invention have been described with reference to their use in a automated pharmacy, the principles of the invention will apply equally to any automated stock storage and retrievable system.

Of course if a particular pack stored in the circulating storage apparatus is declassified as a fast mover it may simply be removed from the apparatus by the robot arm and replaced on the ordinary static shelving so that the space on the circulating storage may be put to better use.

The invention claimed is:

1. An automated stock storage and retrieval system comprising a static storage area, a circulating storage area and stock transfer means for transferring items of stock from an input area to either said static storage area or said circulating storage area based on a decision made by controlling software and for subsequently retrieving said items of stock, the circulating storage area comprising a plurality of storage regions and a dispensing station, wherein said storage regions are arranged to circulate around a continuous path such that each storage region is periodically brought into alignment with the dispensing station so as to allow items to be removed from the storage region at the dispensing station.

2. A system as claimed in claim 1 wherein the circulating storage apparatus is configured to allow items to be placed manually in its storage regions.

3. A system as claimed in claim 1 comprising more than one dispensing station.

4. A system as claimed in claim 1 wherein the storage regions are physically delimited.

5. A system as claimed in claim 1 wherein the storage regions comprise at least one shelf.

6. A system as claimed in claim 5 wherein said shelf or shelves is/are reconfigurable in width and/or height.

7. A system as claimed in claim 1 wherein the dispensing station comprises means for removing items from the storage regions.

8. A system as claimed in claim 7 wherein said means for removing items is arranged to operate by a pushing action.

9. A system as claimed in claim 7 wherein said means for removing items is arranged to operate by a pulling action.

10. A system as claimed in claim 9 comprising a claw arranged to hook over and pull an item off the storage region.

11. A system as claimed in claim 9 comprising a suction probe arranged to generate a reduced pressure between its end face and a side of the item to allow said item to be pulled off by retracting the probe.

12. A system as claimed in claim 1 wherein said dispensing means is adapted to be able to remove a plurality of items simultaneously from a single storage region.

13. A system as claimed in claim 1 wherein the dispensing station comprises a dispensing chute for receiving items which are removed from the storage region at the dispensing station.

14. A system as claimed in claim 1 adapted to circulate said storage regions only when require.

15. A system as claimed in claim 14 adapted to halt said circulation when a desired storage region is aligned with a correct dispensing station or loading point.

16. A system as claimed in claim 1 wherein the stock transfer means is arranged selectively to transfer items between said static storage area and said circulating storage regions or vice-versa.

17. A system as claimed in claim 1 adapted to make up an advance order by transferring items required for the order onto the circulating storage apparatus and subsequently dispensing said order.

18. A method of storing and retrieving a plurality of items of stock using an apparatus comprising an input area, a static storage area and a circulating storage area, said circulating storage area comprising a plurality of storage regions; said method comprising the steps of: making a decision as to whether to load an item of stock into the static storage area or one of the plurality of storage regions, loading said item of stock from said input area to the static storage area or to one of the plurality of storage regions according to said decision, wherein said storage regions circulate around a continuous path such that each storage region is periodically brought into alignment with a dispensing station, the method further comprising subsequently retrieving said item of stock by removing it from the storage region at the dispensing station.

19. A method as claimed in claim 18 comprising pushing said items from said storage regions at the dispensing station.

20. A method as claimed in claim 18 comprising pulling said items from said storage regions at the dispensing station.

21. A method as claimed in claim 20 comprising generating a reduced pressure between an end face of a suction probe a side of an item and pulling said item off by retracting the probe.

22. A method as claimed in claim 18 comprising removing a plurality of items simultaneously from a single storage region.

23. A method as claimed in claim 18 circulating said storage regions only when required.

24. A method as claimed in claim 23 comprising circulating the storage regions until a desired storage region is aligned with a correct dispensing station or loading point.

25. A method, as claimed in claim 18 comprising selectively transferring items between said static storage area and said circulating storage regions or vice-versa.

26. A method as claimed in claim 18 comprising making up and advance order by transferring items required for the order onto the circulating storage apparatus and subsequently dispensing said order.

* * * * *